UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

PYRAZOLONE DYES AND PROCESS OF MAKING THEM.

935,370. Specification of Letters Patent. Patented Sept. 28, 1909.

No Drawing. Application filed June 22, 1909. Serial No. 503,633.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, Germany, have invented new and useful Improvements in Pyrazolone Dyes and Processes of Making Them, of which the following is a specification.

We have discovered that 3-chlor-2-amino-1-methyl-benzene-5-sulfonic acid can be employed in the production of new coloring matters which possess a constitution corresponding to the formula:—

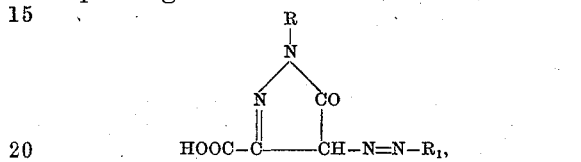

in which either R, or $R_1$, or both, represent the 2-methyl-6-chlor-benzene-4-sulfonic acid residue.

The coloring matters of the formula in which R and $R_1$ both represent the said residue can be obtained, for instance, by combining dihydroxy-tartaric acid with two molecular proportions of the hydrazin of 3-chlor-2-amino-1-methyl-benzene-5-sulfonic acid. It is preferred to produce those in which R and $R_1$ differ from one another by acting with a hydrazin on oxalyl-acetic ester and then upon the compound containing the pyrazolone ring formed with a diazo compound. For the purposes of our invention, either the hydrazin, or the diazo, compound, or both, must be derived from the 3-chlor-2-amino-1-methyl-benzene-5-sulfonic acid. The coloring matters so obtained yield particularly greenish shades of yellow and are also very fast against the action of light.

The coloring matters containing the 2-methyl-6-chlor-benzene-4-sulfonic acid group twice possess exceptionally greenish shades.

The 3-chlor-2-amino-1-methyl-benzene-5-sulfonic acid used in carrying out our invention can be prepared by acting on 2-acidyl-amino-1-methyl-benzene-5-sulfonic acid with chlorin in the presence of water, and then splitting off the acidyl group from the product so obtained, as described and claimed in the specification of the application for British Letters Patent No. 1245 A. D. 1909.

Our new coloring matters consist, when dry, of yellow powders, they are soluble in water yielding from yellow to green-yellow solutions, they dye wool yellow and in the form of their lakes possess a yellow color and are fast to light and upon reduction with tin and hydrochloric acid they yield a pyrazolone of a constitution corresponding to the formula

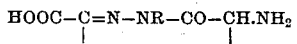

$$HOOC-C=N-NR-CO-CH.NH_2$$

and an amin of a constitution corresponding to the formula $R_1.NH_2$, one at least of the groups R and $R_1$ being 2-methyl-6-chlor-benzene-4-sulfonic acid. The coloring matter which we desire to be understood as claiming specifically is that in which both R and $R_1$ represent the 2-methyl-6-chlor-benzene-4-sulfonic acid residue. It yields a greenish yellow solution in water.

The following examples will serve to illustrate further the nature of our invention and how it can be carried into practical effect, but the invention is not confined to these examples. The parts are by weight.

Example 1: Stir eleven parts of the sodium salt of dihydroxy-tartaric acid with fifty parts of water, and add a suspension of twenty-four parts of the hydrazin of 3-chlor-2-amino-1-methyl-benzene-5-sulfonic acid in fifty parts of water. On heating the mixture, at first to about fifty degrees centigrade and then, gradually, to from seventy, to eighty, degrees centigrade, solution gradually takes place. The coloring matter can be isolated by precipitation with common salt, or with potassium chlorid, if desired, after having acidified the solution. Filter off the coloring matter, and press and dry it. It gives rise to lakes which possess very pure lemon-yellow shades of excellent fastness against the action of light.

Example 2: Diazotize twenty-two and one-fifth parts of 3-chlor-2-amino-1-methyl-benzene-5-sulfonic acid in the usual manner and allow the solution to run, while stirring, into a concentrated solution of thirty parts of 1-para-sulfo-phenyl-5-pyrazolone-3-carboxylic acid, to which sufficient sodium carbonate has been added to maintain the whole alkaline. Stir for about half an hour, then heat to fifty degrees centigrade and precipitate the coloring matter by means of common salt, if desired, after first having acidified the solution. Filter off the coloring matter and press and dry it. It yields a yellow solution in water and dyes wool pure yellow shades.

Now what we claim is:

1. The process of producing coloring matters of the pyrazolone group by combining dihydroxy-tartaric acid with two molecular proportions of the hydrazin of 3-chlor-2-amino-1-methyl-benzene-5-sulfonic acid.

2. The new coloring matters of the pyrazolone group which consist when dry of yellow powders, are soluble in water yielding from yellow to green-yellow solutions, dye wool yellow and in the form of their lakes possess a yellow color and are fast to light and upon reduction with tin and hydrochloric acid yield a pyrazolone of a constitution corresponding to the formula

HOOC—C=N—NR—CO—CH.NH$_2$ and an amin of a constitution corresponding to the formula R$_1$.NH$_2$, one at least of the groups R and R$_1$ being 2-methyl-6-chlor-benzene-4-sulfonic acid.

3. The new coloring matter of the pyrazolone group which consists when dry of a yellow powder, is soluble in water yielding a greenish yellow solution, dyes wool yellow, in the form of its lakes possesses a yellow color and is fast to light, and upon reduction with tin and hydrochloric acid yields a pyrazolone of a constitution corresponding to the formula

HOOC—C=N—NR—CO—CH.NH$_2$ and an amin of a constitution corresponding to the formula R$_1$.NH$_2$, both of the groups R and R$_1$ being 2-methyl-6-chlor-benzene-4-sulfonic acid.

In testimony whereof we have hereunto set our hands in the presence of two subscribing witnesses.

PAUL JULIUS.
ERNST FUSSENEGGER.

Witnesses:
ERNEST F. EHRHARDT,
J. ALEC. LLOYD.